Aug. 20, 1963   R. E. HULTEN   3,101,129
OIL CONTROL BAFFLE
Filed Aug. 28, 1961   2 Sheets-Sheet 1

INVENTOR
RICHARD E. HULTEN
BY *F. J. Sousek*
ATTORNEY

Aug. 20, 1963  R. E. HULTEN  3,101,129
OIL CONTROL BAFFLE
Filed Aug. 28, 1961  2 Sheets-Sheet 2

INVENTOR
RICHARD E. HULTEN

BY

ATTORNEY

United States Patent Office 3,101,129
Patented Aug. 20, 1963

3,101,129
OIL CONTROL BAFFLE
Richard E. Hulten, Pontiac, Mich., assignor to General Motors Corporation, Detroit, Mich., a corporation of Delaware
Filed Aug. 28, 1961, Ser. No. 134,346
2 Claims. (Cl. 184—106)

This invention relates to an oil control baffle adapted to fit inside the oil pan of an internal combustion engine.

Conventional lubricating systems of internal combustion engines have several disadvantages. The familiar hard starting of a cold engine in wintertime is one of these. Another is the common occurrence of erratic changes in the oil level inside the crankcase and oil pan due to different operating conditions. Also, it is commonly known that the accumulation and jelling of lubricant around the crankshaft, crank arms, counterweight, and connecting rods put a heavy initial burden on the ignition system aside from being a major cause of engine wear due to lack of effective initial lubrication on the surfaces of the moving parts of the engine.

Still another problem of conventional lubricating systems with deep sumps is that they require relatively high mounting of the engine to the chassis despite the modern trend to lower the drive line, center of gravity and silhouette.

Certain attempts to obviate the above problems have resulted in costly and extensive changes in the oil pan and cylinder block construction. Simpler solutions to the problem such as the use of baffle means or shell means inside the oil pan have been ineffective for various reasons, such as excessive foaming due to churning of the oil by the moving parts.

The engine oil sump is provided to obtain storage capacity for a sufficient operating quantity of lubricating oil and to provide control of this oil under various operating conditions to insure a continuous supply of oil to the pump. This is ordinarily accomplished by making the sump sufficiently deep to perform this function. This construction also keeps the static oil level below the various engine moving parts such as the crankshaft, with its throws and counterweights, and the connecting rod bearings and caps. When a shallow sump is provided in order to lower the engine in a vehicle chassis and maintain ground clearance, the static oil level must either be raised into the moving parts or the oil capacity must be reduced below that normally desired. In addition, this construction results in loss of oil control under certain operating conditions.

An oil control baffle embodying the invention permits the use of a shallow sump with no sacrifice in oil capacity or control and permits the static oil level in the sump to rise above the lower limit of the moving parts without interfering with them. Such a baffle also allows the majority of the oil to drain into the sump oil when the engine is shut down while shielding the moving parts from the rising sump oil level.

A continuous oil supply for the oil pump under various operating conditions is provided by the general arrangement of the dams, gutters, and gutter inclinations. The arcuately shaped control portion of the baffle is contoured to provide a minimum clearance to the connecting rod envelope which in most cases will be the clearance limit rather than the crank arms or counterweights. The small quantities of oil that are trapped in the central baffle portion are thrown into the gutters by movement of the crankshaft and connecting rods when the engine is started. The auxiliary dams are so situated that the trapped oil is positioned in the path of the connecting rod bearing caps. The main dam of the baffle allows the static oil level to be raised to the height of the dam when the vehicle having the engine installed therein is parked. When the engine and vehicle are operating on substantially level ground the oil accumulating in the central portion of the baffle forward of the dam drains rearwardly to the dam, then transversely into the gutters, and then into the sump.

An object of this invention is the provision in an oil pan of a one piece shell or oil control baffle having a drain-back feature, which baffle is placed beneath the crankshaft and substantially throughout the length of the oil pan to shield the crank arms and other rotating parts from the accumulation of lubricant in the oil pan and thus prevent hard starting of a cold engine due to moving parts standing in a substantial volume of accumulated drain-back oil which has jelled. The baffle means employed allows only a small portion of oil to be trapped in the center of the baffle when the engine is not running.

Another object is the use of dam means for trapping a certain amount of oil and controlling oil drain-back to enable the engine to operate under all conditions.

Still another object of the baffle means of the invention is to enable or permit an engine to be mounted lower in the vehicle chassis in accordance with the modern trend to lower automotive design by allowing the static oil level in the sump to rise above the lower limit of the moving parts without interfering with those parts.

Referring to the drawings.

Figure 1:
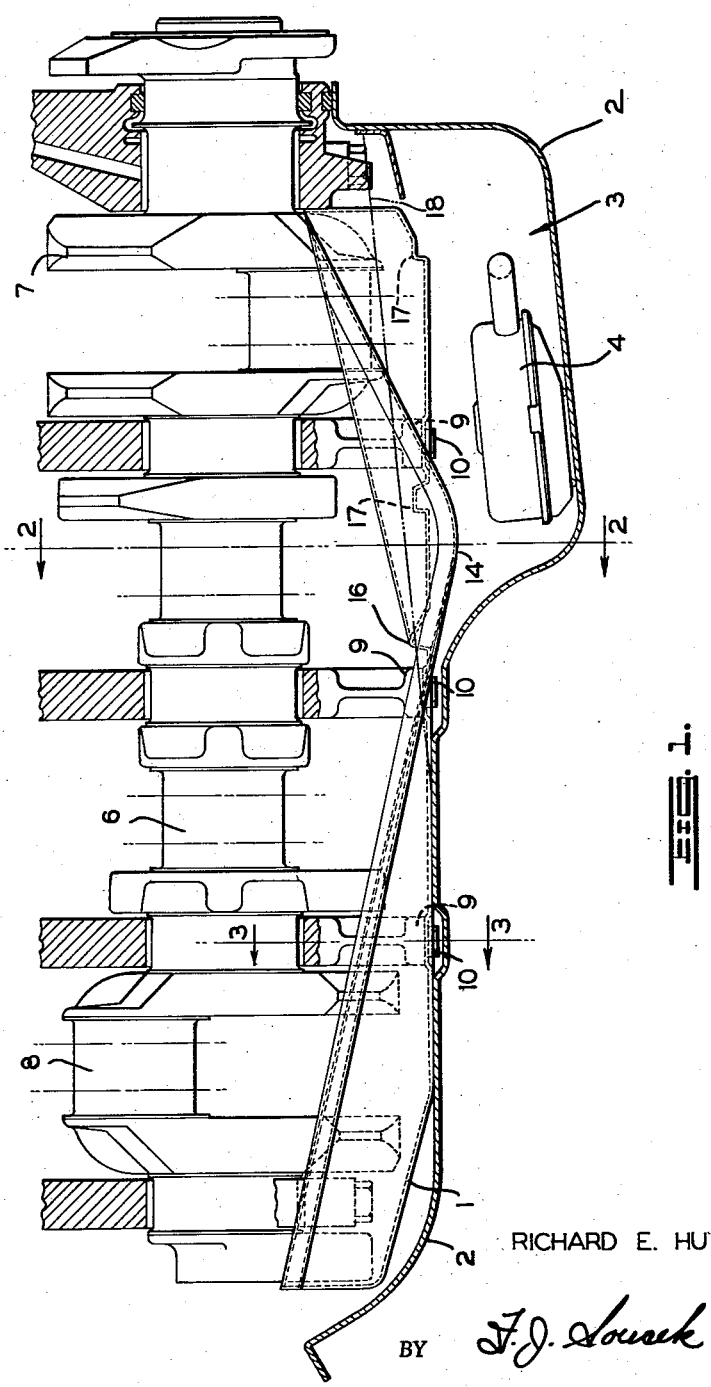
FIGURE 1 is a longitudinal sectional view, with parts broken away, of an oil control baffle constructed in accordance with the invention.

The structure shown in the drawing involves an oil control baffle 1 adapted to fit inside the oil pan 2 of an internal combustion engine, such as a V-8 engine. It may be utilized in any engine requiring a shallow sump. The oil pan 2 is considerably reduced in height and has an oil pump which is not shown situated in the oil sump 3 of the pan. The pump is suitably located at one side of the pump screen inlet 4. The baffle forms an arcuately-shaped central portion 5 which extends throughout the length of the crankshaft 6. The counterweight 7 and crank arms 8 rotate within this central arcuate portion 5. There is only a small clearance between the rotating parts 7 and 8 and the central arcuate portion 5 of the baffle. The baffle 1 is attached to a transverse section of the engine by using the main bearing caps 9 and cap screws 10. The baffle extends into outer portions or edges 11 and 12 which have inclined gutters or drain troughs 13 joined thereto. These gutters or drain troughs 13 slope from opposite ends of the baffle 1 toward the center 14 of the baffle where openings or drain holes 15 are formed in the baffle directly above the oil sump 3. Dam 16 and auxiliary dams 17 are formed in the lower part of the baffle near the center portion 14. The oil level indicated by line 18 is with the engine at rest on level ground and a full sump.

Figure 2:
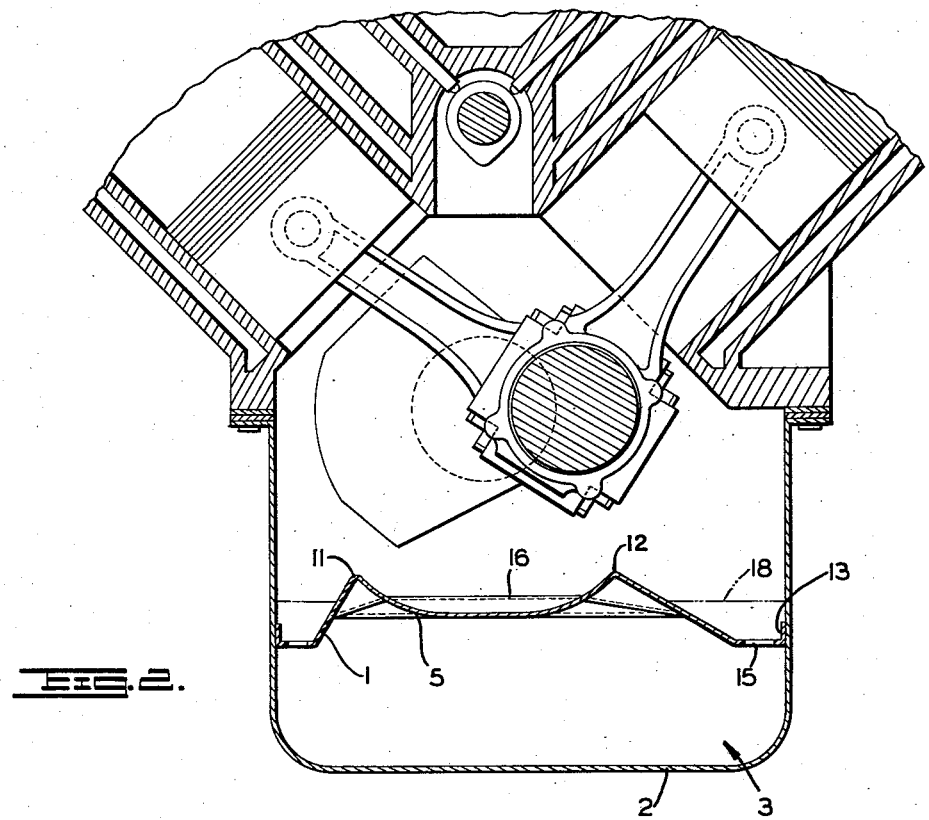
FIGURE 2 is a transverse section taken in the direction of arrows 2—2 of FIGURE 1.

FIGURE 2 is a transverse view taken along center portion 14 of the baffle and shows oil pan 2 with its oil sump 3 and the arcuate section 5 of the oil control baffle with its upwardly curved edges 11 and 12 joined by the gutters or drain troughs 13 which abut the sides of the pan 2. The lowest portions of the inclined drain troughs 13 have the drain holes 15 formed therein. Dam 16 runs transversely across the baffle between the edges 11 and 12.

Figure 3:
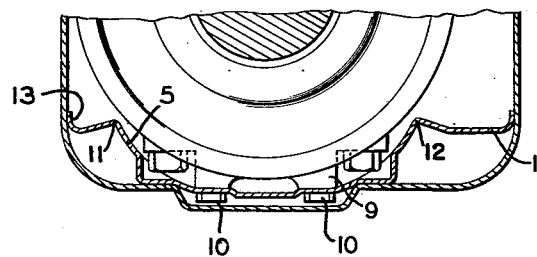
FIGURE 3 is a transverse section taken in the direction of arrows 3—3 of FIGURE 1.

FIGURE 3 gives a transverse view on line 3—3 showing the orientation of the oil control baffle 1 to the engine structure by means of the main bearing caps 9. Cap screws 10 are used to secure the baffle transversely to the engine. Arcuate section 5 can be seen to extend outwardly into edges 11 and 12 joined by the inclined drain troughs 13.

The construction of the oil control baffle 1 allows a shallower sump 3 to be used while at the same time maintaining desired oil capacity. The central arcuate portion 5 of the baffle allows a minimum of clearance between the counterweights 7 and crank arms 8 which rotate inside the baffle. This allows the oil level in the oil sump 3 to rise above the lower extremities of the rotating parts with a minimum amount of foaming due to the moving parts churning the oil. The particular shape and construction of the baffle provide control of the sump oil level under all operating conditions and provide an efficient drain-back feature by means of the drain troughs 13 which return substantially all the oil to the sump 3 when the engine is shut off. Therefore, only a small portion of oil is trapped in the arcuate portion 5 when the engine is not running.

The inclined drain-back gutters 13 are so constructed and situated that oil will drain back into the sump when the motor is running and the vehicle is operating in uphill or downhill grades of up to 32 degrees. Even under extreme conditions a sufficient supply of oil is assured for the oil pump inlet.

When operating on uphill roads or level conditions, or when the vehicle is parked, oil accumulates in the center of the baffle but forward of the dam 16 and will drain to the rear of the baffle toward the dam. Oil which collects in the drain-back gutter 13 drains toward the lowest part of the gutter under all operating conditions, then into the sump 3 by means of the openings or drains 15 in the lowest portion of the gutter. Any oil found to accumulate in the center portion of the baffle, but to the rear of the dam 16, when the vehicle is operating on level or uphill roads, is thrown out by rotation of the counterweight 7 and crank arms 8 into the sump 3 or the inclined drain-back gutters 13.

When the vehicle is operating downhill the oil level is maintained up to the base of the dam 16 without flooding the center portion of the baffle forward of the dam. Any oil which accumulates forward of the dam is thrown out by the rotating parts into the sump 3 or gutters 13. Part of the oil will occupy the space between the oil control baffle 1 and the oil pan 2 forward of the dam. This portion of oil is out of the way of the moving parts and allows the oil level in the sump to stay below the base of the dam.

What is claimed is:

1. In an internal combustion engine having a frame, a crankshaft rotatably mounted in the lower portion of said frame, said crankshaft provided with a plurality of crankthrows and counterweights, a shallow oil pan having a relatively shallow sump region in the rear portion thereof and being sealingly mounted at the periphery to close the lower portion of said frame and extending beneath said crankshaft, a metered quantity of oil in said pan sufficient to satisfy the maximum requirements of said engine and being of a volume greater than said sump, the improvement comprising a baffle means mounted between said crankshaft and pan, said baffle means including a level longitudinal central portion having upwardly curved edges, said central portion being configured so as to allow minimum clearance for said crankthrows and counterweights, trough means joined to the longitudinal edges of said central portion and abutting the sides of said pan, said trough means being inclined toward the center of said baffle from the opposite ends thereof, drain holes located in said trough means at the lowermost point thereof, and damming means extending across said longitudinal central portion between the upwardly curved edges and forward of said drain holes, said damming means being of a height sufficient to prevent the forward flow of oil in said central portion whereby the static oil level in said pan is permitted to rise above the lower extremities of said crankshaft in a region rearward of said damming means.

2. The device as described in claim 1 and in addition comprising auxiliary damming means extending across said longitudinal central portion between the upwardly curved edges to form localized pools of oil in said central portion in the path of said crankthrows and counterweights whereby rotation of said crankshaft throws the localized oil from said central portion into said troughs.

References Cited in the file of this patent

UNITED STATES PATENTS

| | | |
|---|---|---|
| 1,396,050 | Palmer | Nov. 8, 1921 |
| 1,447,788 | Kirkham | Mar. 6, 1923 |
| 1,717,872 | Brush et al. | June 18, 1929 |